United States Patent [19]
Menzinger et al.

[11] Patent Number: 5,332,677
[45] Date of Patent: Jul. 26, 1994

[54] DYNAMICAL DESTABILIZATION OF SYSTEM CHARACTERIZED BY ACTIVATION/INHIBITION KINETICS USING A DIFFERENTIAL FLOW

[76] Inventors: Michael Menzinger, 46 Brunswick Avenue, Toronto, Ontario M5S 2L7; Arkady Rovinsky, 3886 Bathurst Street, Apt. 106, Toronto, Ontario M3H 3N5, both of Canada

[21] Appl. No.: 932,560

[22] Filed: Aug. 20, 1992

[51] Int. Cl.[5] .................... G01N 33/00; G01N 37/00
[52] U.S. Cl. ........................................ 436/35; 436/69
[58] Field of Search .............................. 436/35, 69

[56] References Cited

U.S. PATENT DOCUMENTS

| | | |
|---|---|---|
| 4,832,914 | 5/1989 | Tam et al. ............................ 422/130 |
| 4,968,484 | 11/1990 | Nosticzius et al. ................. 422/68.1 |
| 5,196,126 | 3/1993 | O'Dowd .............................. 210/754 |

OTHER PUBLICATIONS

V. Castets et al., "Experimental Evidence of a Sustained Standing Turing-Type Nonequilibrium Chemical Pattern", Phys. Rev. Lett., 1990, vol. 64, No. 24, pp. 2953-2955.
Q. Ouyang et al., "Transition to Chemical Turbulence", Chaos., 1991, vol. 1, No. 4, pp. 411-420.
H. Meinhardt., *Models of Biological Pattern Formation.*, 1982, Academic Press, Chapter 3, pp. 10-17.
Aguado et al; "Dynamics of Pattern Formation . . . "; Phys. Rev. A. Gen. Phys.; 39(11), 5686-96; 1989. (ABS).
Pearson et al; "Turing Instabilities with Nearly Equal Diffusion Coefficients"; J. Chem. Phys.; 90(3); 1588-99, 1989. (ABS).
Arneodo et al.; "Instabilities at Front Patterns . . . "; Physica; 49(1-2); 141-60, 1991. (ABS).
Li; "Conditions for the Occurrence . . . "; Phys. Lett. A.; 147(4); 204-208; 1990 (ABS).
Malchow; "Spatial Patterning . . . "; Mem. Fac. Sci. Kyoto, Univ. Ser. Biol.; 13(2); 83-100; 1988, Coden: MFKBBJ (ABS).
Belintsev et al; "Model of Pattern Formation . . . "; J. Theor. Biol.; 129(4); 1987, 369-394 (ABS).
Harris et al; "Generation of Spatially Periodic Patterns . . . " J. Embryol Exp. Morphol.; 80(0), 1-20; 1984. (ABS).
Erneux et al; "Turing's Theory in Morphogenesis"; Bull. Math. Biol.; 40(6); 771-790; 1978. (ABS).
Harrison et al., "Kinetically Cooperative Models:- Boundary Movement in Optical Resoln., Phase Transitions, and Biological Morphogenesis"; Canadian Journal of Chem; vol. 66 (4), 839-849; 1988.
Hjelmfelt et al; "Chemical Implementation of Neural Networks and Turing Machines"; Proc. Natl. Acad. Sci. USA; vol. 88, pp. 10983-10987, Dec. 1991.
Wheeler et al. "Spatiotemporal Patterns of Expression of NGF and the Low Affinity NGF Receptor in Rat Embryous Suggest Functional Roles in Tissue Morphogenesis and Myogenesis"; Journal of Neuroscience; vol. 12 (3), pp. 930-945, Mar. 1992.

*Primary Examiner*—Robert J. Warden
*Assistant Examiner*—L. M. Crawford
*Attorney, Agent, or Firm*—Shlesinger Arkwright & Garvey

[57] ABSTRACT

A new method of inducing spatiotemporal structures in systems characterized by activation/inhibition kinetics through the action of a differential bulk flow of the key species is disclosed. As Turing predicted, a homogeneous and otherwise stable steady state of a reactive system may lose its stability and form inhomogeneous patterns due to the interaction of diffusion and reaction. This mechanism is believed to form the basis of biological morphogenesis. The Turing instability only arises in systems wherein the diffusion coefficient of the inhibitor is sufficiently greater than that of the activator. The method of the present invention avoids this constraint by using a differential flow between the activation and the inhibition species rather than a differential diffusivity. In one aspect of the invention, this differential flow is achieved by immobilizing one of either the inhibitor or activator species in the flow system containing the other species. The resulting destabilized system, which in this aspect is a BZ reaction, is characterized by travelling waves whose length and propagation velocity are proportional to the flow rate. Technological advantages are disclosed that arise from the operation of a kinetic system under such conditions of differential flow that give rise to the dynamical instability.

8 Claims, 7 Drawing Sheets

DYNAMICAL DESTABILIZATION OF SYSTEM CHARACTERIZED BY ACTIVATION/INHIBITION KINETICS USING A DIFFERENTIAL FLOW

FIELD OF THE INVENTION

The present invention relates to a method of inducing self-organization and spatiotemporal structures by destabilizing the homogeneous steady state of a broad class of systems characterized by activation/inhibition kinetics through the action of a differential flow of the species.

BACKGROUND OF THE INVENTION

Turing predicted that a homogeneous and otherwise stable steady state of a reactive, kinetic system comprising an activator and inhibitor species may lose its stability and form inhomogeneous patterns due to the interaction of diffusion and reaction [A. Turing, Philos. Trans. Roy Soc. London Ser. B 237, 37 (1952)]. This prediction has been recently verified experimentally by Castets et al. wherein pattern formation was observed in the chlorite/iodide/malonic acid system [V. Castets et al., Phys. Rev. Lett. 64, 2953 (1990)]. These results support the Turing prediction that indeed a homogeneous and otherwise stable reactive system may lose its stability (Turing instability) and form inhomogeneous patterns due to the interaction of diffusion and reaction.

This mechanism is believed to be fundamental to morphogenesis in biological systems [H. Meinhardt, *Models of Biological Pattern Formation*, Academic Press (1982)]. Specifically, the Turing instability can occur in a chemical or biochemical system comprising an activator species A which stimulates its own production and the production of its antagonist, an inhibitor I, if the diffusion coefficient of the inhibitor I is sufficiently greater than that of the activator A [Meinhardt, 1982]. When such a system is maintained in a homogeneous condition such as by stirring or other agitation means, it settles into a steady state through the balance of activation and inhibition. However, when a local concentration fluctuation arises in a non-agitated system, diffusion comes into play in addition to chemical relaxation. Diffusion acts to remove or replenish species that are locally in excess or depleted respectively, as the case may be. When this process proceeds at different rates for the two species proportional to their diffusivities, the balance between the activator and inhibitor that existed in the perfectly stirred system may be broken in such a way as to permit the activator concentration to grow locally [Meinhardt, 1982]. Therefore, the primary role of diffusion in the instability is to spatially disengage the counteracting species.

The physical constraints under which the Turing instability is achieved are quite severe and can occur in an activator/inhibitor system only if the diffusion coefficient of the inhibitor is sufficiently larger than that of the activator, i.e. if $\delta \equiv D_{inh}/D_{act} > \delta_c > 1$. In other words, the Turing instability can only be observed in activator/inhibitor systems comprising different diffusivities of the activator and inhibitor species. However, in most liquid systems there is generally little difference in the diffusion coefficients for the different species and the ratio $D_{inh}/D_{act}$ is beyond experimental control: hence the Turing instability is not a common occurrence.

Accordingly, it would be advantageous to provide a general method of both inducing and controlling periodic structures in systems governed by activation/inhibition kinetics which would be generally applicable to biological systems and a wide range of chemical and physical systems including liquids, solids and plasmas.

The subject invention provides a method of dynamical destabilizing physical systems characterized by activation/inhibition kinetics through the action of a differential flow between the activator and inhibitor species. Specifically, there is provided a method of inducing spatiotemporal structures in systems which include activation and inhibition means and in which the system is characterized by coupled activation and inhibition kinetics. The method comprises producing a differential flow between the activation means and the inhibition means, wherein the differential flow is greater than a predeterminable threshold differential flow.

BRIEF DESCRIPTION OF THE DRAWINGS

The method of inducing and controlling spatiotemporal structures in physical systems characterized by activator/inhibitor kinetics will now be described, including representative examples of devices in which these structures may be formed, reference being had to the drawings, in which:

FIG. 1 a) shows the real part of the eigenvalue of the linear stability matrix as a function of the wavenumber for different flow velocities υ (cm/sec) (without diffusion); b) the same as (a) but with diffusion of species X (define in the description) being taken into consideration with species X having a diffusion coefficient given by $D_x = 2 \times 10^{-5}$; and c) the real part of the eigenvalue for different ratios $\delta \equiv D_{inh}/D_{act}$ of the diffusion coefficients and zero flow velocity. Parameters of the Model, referred to as the Puschinator model are: A=0.125, B=0.2, C=0.0003, $h_0$=0.03.

FIG. 3 shows the evolution of a perturbation in the circular reactor with flow of the X species. a) The initial stage of the instability; b) the instability has developed into a pulse train travelling around the medium; A=0.15, υ=0.2, all the other parameters are as in FIG. 1. The vertical scale in b) is 10 times as large as in a).

FIG. 6 is a) the velocity and b) length of the waves generated by DIFICI in the experiment using the apparatus of FIG. 4; the concentrations are as in FIG. 5. c) The velocity and d) length of the waves simulated by the numerical integration of the Puschinator model. The parameters are as in FIG. 5 except for [Fe(-phen)$_3$]=$3 \times 10^{-4}$M (to account for packing density).

DETAILED DESCRIPTION OF THE INVENTION

The present invention relates to systems containing activation means and inhibition means and characterized by inhibition/activation kinetics. The basis of the present invention is the idea that the inhibition and activation means may be disengaged by their differential flow. Technological advantages will be disclosed that arise from the operation of a kinetic activator/inhibitor system under conditions of differential flow such that the homogeneous state is destabilized. It will be disclosed herein that the homogeneous steady state may be destabilized of activation means and inhibition means at different flow rates, regardless of which one is faster. This makes the present mechanism free of the rather severe restrictions of the Turing instability on the diffusion coefficients and thus much more general. We refer to the mechanism generally as the Differential Flow Induced Instability (DIFII) and in chemical systems more specifically as the Differential Flow Induced Chemical Instability (DIFICI).

Consider a situation where one of the species, Y, is immobilized on a solid support [J. Maselko et al., *Nature* 339, 609 (1989)] while the X species flows through the one-dimensional reactor with velocity $v$. This system is described by the reaction-flow-diffusion equations $$\dot{X} = f(X, Y) + v\frac{\partial X}{\partial r} + D\frac{\partial^2 X}{\partial^2 r} \quad (1)$$

$$\dot{Y} = g(X, Y)$$

where the spatial coordinate axis is chosen to lie in the direction of the flow. We assume that the chemical reaction has a stable steady state $X_0$, $Y_0$ (i.e. $f(X_0,Y_0)=g(X_0,Y_0)=0$) when run in a perfectly stirred vessel.

Linearizing the system near the steady state while ignoring the diffusion term results in:

$$\dot{x} = a_{11}x + a_{12}y + v\frac{\partial x}{\partial r} \quad (2)$$

$$\dot{y} = a_{21}x + a_{22}y$$

where $X=X_0+x$, $Y=Y_0+y$, and stability requires that $a_{11}+a_{22}<0$ and $\Delta \equiv a_{11}a_{22}-a_{12}a_{21}>0$. With reference to equation (2), we call species X an activator if $a_{11}>0$ and call species Y an activator if $a_{22}>0$. Conversely, X is called an inhibitor if $a_{11}<0$ and Y is called an inhibitor if $a_{22}<0$.

Assume now that our system is either spatially infinite or periodic (a ring). Then we can use the spatial Fourier expansion $x(r,t)=\int x_k(t)e^{ikr}dk$ and obtain the equations for the Fourier-components $$\dot{x}_k=(a_{11}+ikv)x_k+a_{12}y_k \dot{y}_k=a_{21}x_k+a_{22}y_k \quad (3)$$

The eigenvalues of system (3) are $$\lambda_{1,2} = \frac{1}{2}[a_{11} + a_{22} + ikv \pm \sqrt{(a_{11}+a_{22})^2 - 4\Delta - k^2v^2 + 2ikv(a_{11}-a_{22})}] \quad (4)$$

The real part R of the square root in eq. (4) is $$R = \frac{1}{\sqrt{2}}\sqrt{\sqrt{(Q-k^2v^2)^2 + 4k^2v^2(a_{11}-a_{22})^2} + Q - k^2v^2} \quad (5)$$

where $Q=(a_{11}+a_{22})^2-4\Delta$.

It can be shown that the sign of $dR/d(k^2)$ is either always positive (if $a_{12}a_{21}<0$) or negative (if $a_{12}a_{21}>0$) and consequently that R is a monotonic function of k. Then, depending on the sign of $dR/d(k^2)$, $Re\lambda_1(k)$ rises/falls monotonically from $Re\lambda_1(0)$ to $Re\lambda_1(\infty)$ and $Re\lambda_2(k)$ falls/rises from $Re\lambda_2(O)$ to $Re\lambda_2(\infty)$. It follows that $Re\lambda_1(\infty)=a_{11}$ and $Re\lambda_2(\infty)=a_{22}$ if $a_{11}>a_{22}$ and that $Re\lambda_1(\infty)=a_{22}$ and $Re\lambda_2(\infty)=a_{11}$ if $a_{11}<a_{22}$.

Let us assume that $a_{11}>a_{22}$. Furthermore, if $a_{11}>O$ and still subject to $a_{11}+a_{22}<O$, then it is clear that $Re\lambda_1$ becomes positive at sufficiently large k. A positive value of $Re\lambda_1$ implies instability of the homogeneous steady state $(X_0, Y_0)$. Hence the system becomes unstable against short wavelength perturbations. The critical wave number $k_c$ (i.e. such that $Re\lambda_1(k_c)=O$) is $$k_c = -\frac{a_{11}+a_{22}}{v}\sqrt{-\frac{\Delta}{a_{11}a_{22}}} \quad (6)$$

Since $\lambda$ is always complex for $k>0$ the instability is of the travelling wave type. When diffusion is included, the dispersion relation is $$Re\lambda_1 = \quad (7)$$

$$\frac{1}{2}\left[a_{11} + a_{22} - (D_1+D_2)k^2 + \frac{1}{\sqrt{2}}\sqrt{\sqrt{q^2+p^2}+q}\right]$$

where $$p=2kv[a_{11}-a_{22}-(D_1-D_2)k^2],$$

and $$q=[a_{11}-a_{22}-(D_1-D_2)k^2]^2+4a_{12}a_{21}-k^2v^2$$

Figure 1A:
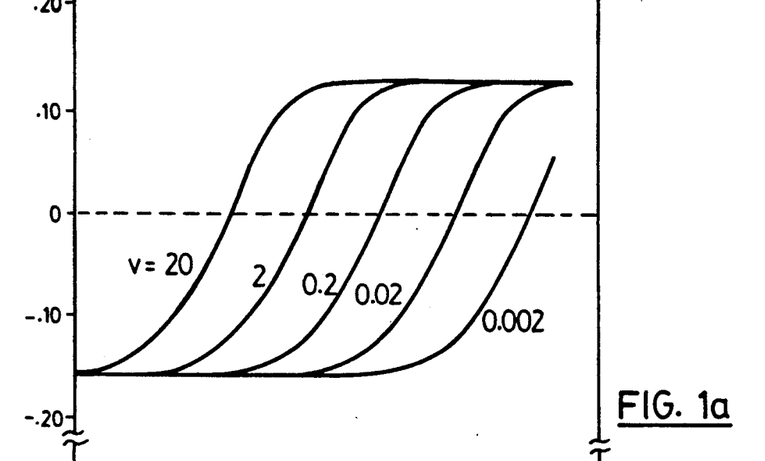

To illustrate this DIFICI case of spatial instability on hand of an experimentally verifiable system, we consider here the Puschinator model [A. B. Rovinsky et.al., *J. Phys. Chem.*, 88, 6081 (1984)] of the Belousov-Zhabotinsky (BZ) reaction $$\frac{dx}{d\tau} = \frac{1}{\epsilon}\left[x(1-x) - \left(2q\alpha\frac{y}{1-y} + \beta\right)\frac{x-\mu}{x+\mu}\right] \quad (8)$$

$$\frac{dy}{d\tau} = x - a\frac{y}{1-y}$$

where $[Fe(phen)^{3+}{}_3] \equiv Y = Cy$, $[HBrO_2] \equiv X = k_1Ax/2k_4$,
$\epsilon = k_1A/k_4C$, $\alpha = k_4k_8B/(k_1A)^2h_o$, $\mu = 2k_4k_7/k_1k_5$,
$t = \tau k_4C/(k_1A)^2h_o$, $\beta = 2k_4k_{13}B/(k_1A)^2h_o$,
$C = [Fe(phen)^{2+}{}_3] + [Fe(phen)^{3+}{}_3]$,
$A = [NaBrO_3]$, $B = [CHBr(COOH)_2]$, $h_o$ is the acidity function, q is the stoichiometric factor, and $k_i$ are the rate constants [Rovinsky et al., 1984], [R. R. Aliev et al., *J. Phys. Chem.*, 96, 732 (1992)]. (Here we use Y/y for [Fe(phen)$^{3+}_3$] instead of the traditional notations Z/z). Dispersion curves Re$\lambda_1$(k) were calculated in the absence of diffusion as functions of k for different values of the flow rate $v$, as shown in FIG. 1a. As one can see, for any velocity $v$ there is a critical wavenumber given by equation 6 above which the homogeneous state becomes unstable.

Figure 1B:
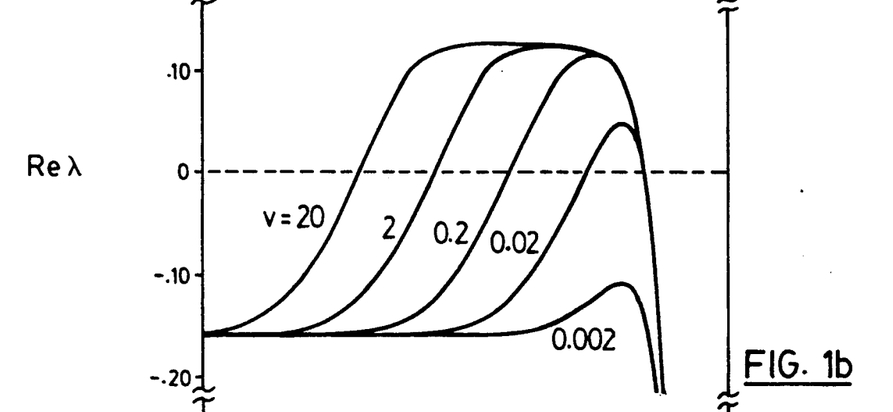
Figure 2:
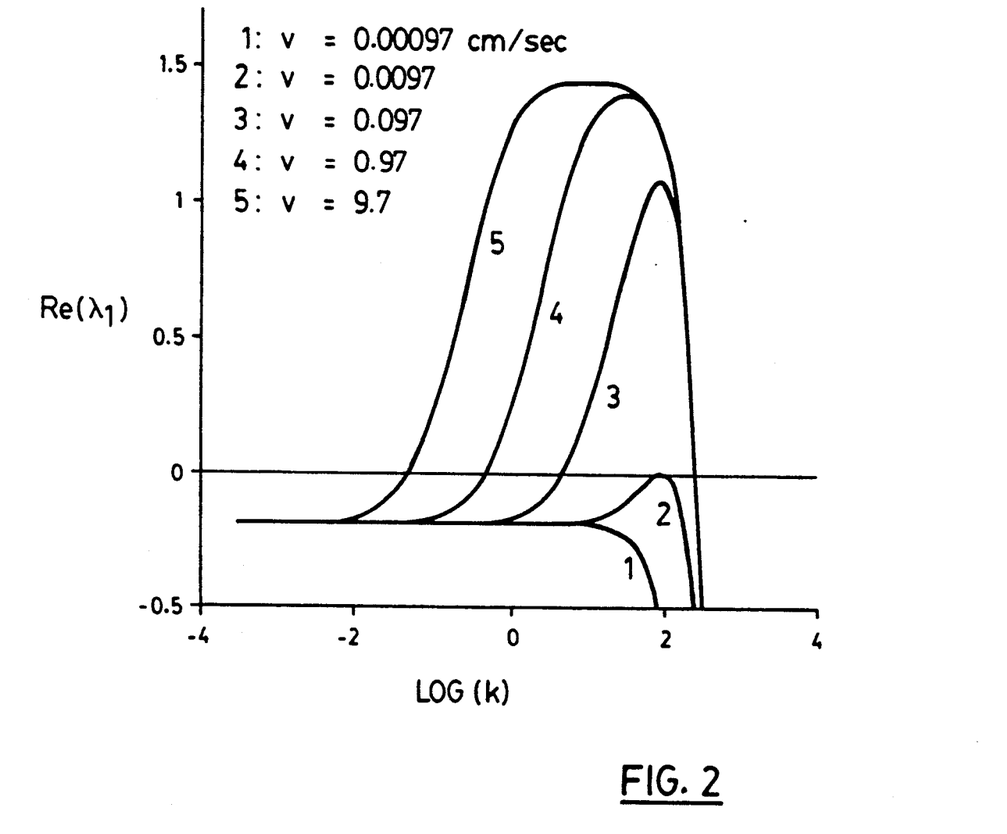
FIG. 2 shows the real part of the eigenvalue as a function of the wavenumber for the DIFICI in the Puschinator model, the parameters are as in FIG. 7c and d below.

In real systems, whether the general non-chemical DIFII applies or in chemical systems in which DIFICI applies, diffusion must be considered in addition to flow. Introducing autocatalyst diffusion (the inhibitor is immobilized) through the diffusion term in equation (1) produces the short wavelength cut-off in the dispersion curves, as shown in FIG. 1b. This entails the appearance of a threshold flow velocity $v_{min}$, below which the homogeneous steady state is always stable. This critical flow velocity corresponds to curve 2 in the dispersion relation plotted in FIG. 2. This critical velocity as well as the critical wave number $k_c$ are implicitly given by the conditions: Re$\lambda_1(k_c)$=0 and d(Re$\lambda_1(k_c)$)/d($k^2$)=0. The accurate explicit expressions for $k_c$ and $v_{min}$ are rather cumbersome in this case but a rough estimate gives: $k_c \sim \sqrt{|a_{11}+a_{22}|/D}$. The critical flow velocity $v_{min}$ is approximately given by $$v_{min} \sim \sqrt{(a_{11}+a_{22})\Delta D/a_{11}a_{22}} \quad (9)$$

Figure 1C:
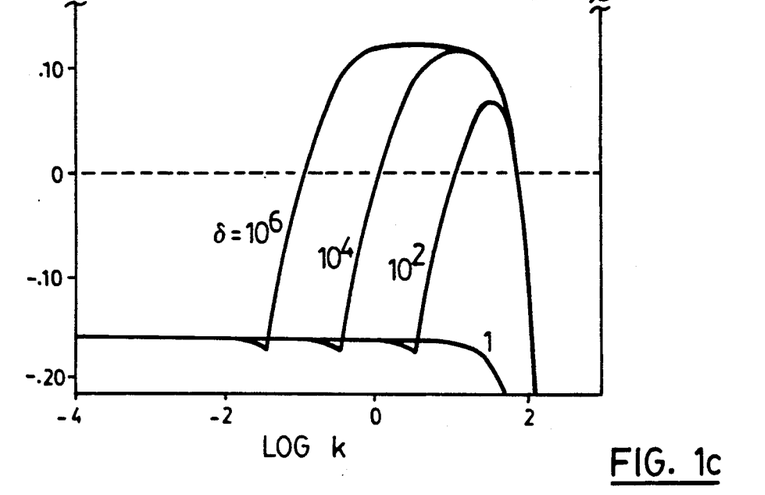

It is also worth noting that the dispersion curves at constant diffusion ratio $\delta = D_{inh}/D_{act}$, parametrized by $v$ resemble closely those of the Turing case parametrized by $\delta$ in the absence of the flow as illustrated in FIG. 1c.

Figure 3A:
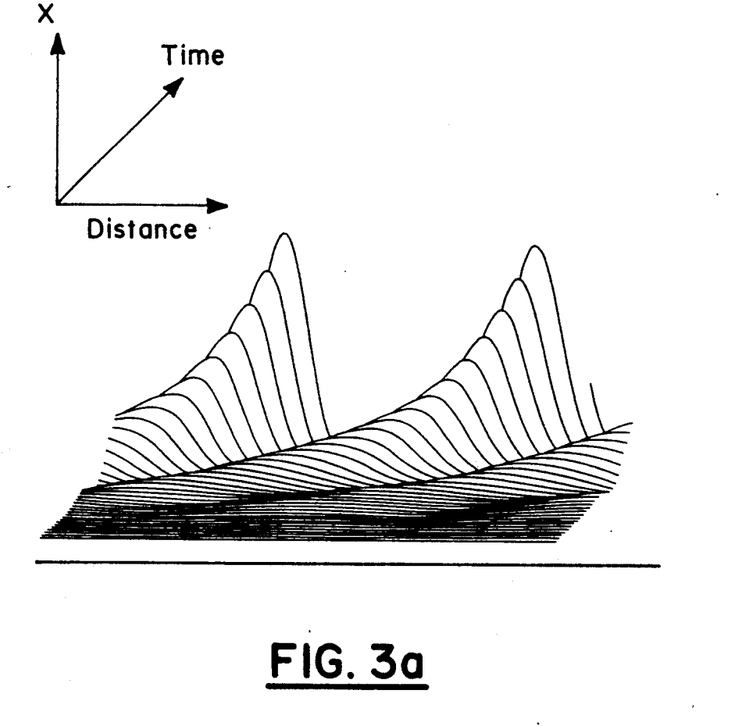
Figure 3B:
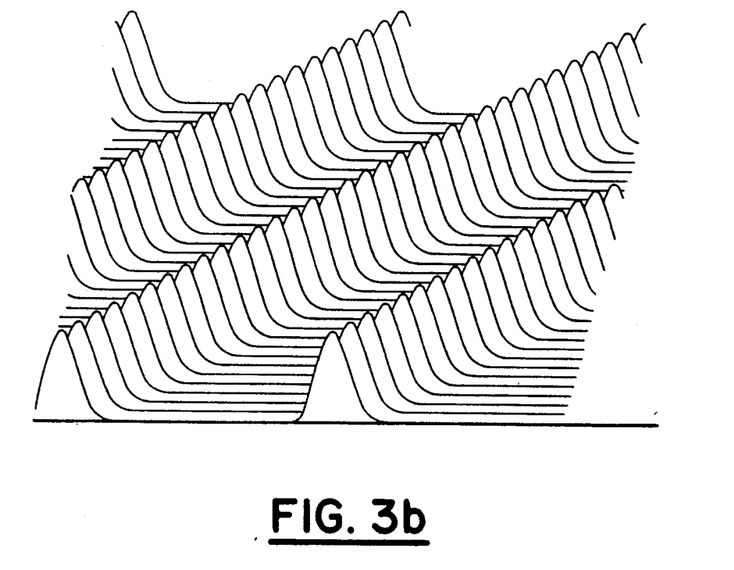

To study the dynamical consequences of the DIFICI we have numerically integrated the reaction-diffusion-flow equations for the Puschinator model as described elsewhere [Aliev et al., 1992]. Two configurations of the 1-D reactor were studied. One was circular, with periodic boundary conditions. The other corresponded to a semi-infinite tube, fixed in the frame of immobilized ferroin species, that was fed with an input flow containing neither ferroin nor the autocatalyst HBrO$_2$ (Dirichlet's boundary condition). In the circular reactor, the perturbation of the homogeneous state was imposed as a cosine function of the spatial coordinate with an amplitude equal to 1 percent of the steady state value. In the tubular reactor, the boundary condition itself acted as the perturbation. In both configurations the perturbations evolved into pulses that travelled along the tube like ordinary pulses in excitable media as long as the flow velocity exceeded the minimum value. Otherwise they decayed to the stationary homogeneous state in the opposite case. The evolution and asymptotic form of a typical pulse train travelling around the circular reactor are shown in FIG. 3.

The difference between the waves simulated here and ordinary trigger waves [A. T. Winfree, *When Time Breaks Down*, Princetown Univ. Press, 1987] lies in their origin. The generation of trigger waves is always associated with a local pacemaker and local inhomogeneity [Winfree, 1987] that imposes a finite perturbation (either single, periodic or multiple aperiodic) on the system and thus locally drives it above the excitation threshold.

The pacemaker emits waves with radial symmetry. If the perturbation is smaller than the threshold, trigger waves do not appear and the system remains stable and homogeneous. In the present case, due to the instability, the waves develop all over the system from infinitesimally small perturbations and are asymmetric, that is they propagate only in the direction of the flow.

The present instability has also much in common with the Turing instability. The obvious analogy is that the necessary condition for both instabilities is the same: $a_{11}$ or $a_{22}$ must be positive, implying the presence of an autocatalytic species. If a diagonal element, either $a_{11}$ or $a_{22}$, is positive then the corresponding species grows exponentially provided that the concentration of the other species is fixed. This similarity is illustrated by the dispersion relation illustrated by FIGS. 1b or 1c where the latter represents the Turing case. The same decay rates at k=0 and the maximal growth rates of perturbations (=$a_{11}$) for both Turing and differential flow cases illustrate the fact that the ultimate cause of the instabilities in both cases is the local autocatalytic kinetics of one of the species while the differential transport, be it achieved by diffusion or by bulk flow, serves merely to disengage the autocatalyst from the inhibitor response.

While the occurrence of the Turing instability depends crucially on the ratio of diffusion coefficients $\delta$ (with $\delta > \delta_c > 1$, where $\delta_c$ is the critical value of $\delta$, a condition that is usually beyond experimental control although theoretically $\delta$ is often treated as the control parameter), the flow induced instability is determined merely by the magnitude $|v|$ of the relative flow velocity (or rather by the ratio $|v|/\sqrt{D}$ when diffusion is included). Thus it is immaterial which of the two control species is immobilized: fixing the inhibitor [Maselko et al., 1989] promotes the DIFICI while this would prevent the Turing instability from occurring. Furthermore, the flow rate is easily controlled over a wide range. Therefore, we foresee that this instability occurs in a broad class of experimental systems.

Up to now the analysis applies to systems of infinite size L=$\infty$. Given the intrinsic wavelength of the patterns, it is clear that there is a critical size $L_c(v)$ below which patterns cannot develop. Both $L_c(v)$ and $v_{min}$ must be considered for real systems.

In summary, it has been shown that in the DIFICI the key species may be uncoupled more generally than in the Turing instability by their differential flow. Specifically, it has been shown that the homogeneous steady state may be destabilized by flows of activator and inhibitor at different flow rates, regardless of which one is faster. This makes the mechanism free of the Turing restrictions on the diffusion coefficients and thus much more general.

Figure 4:
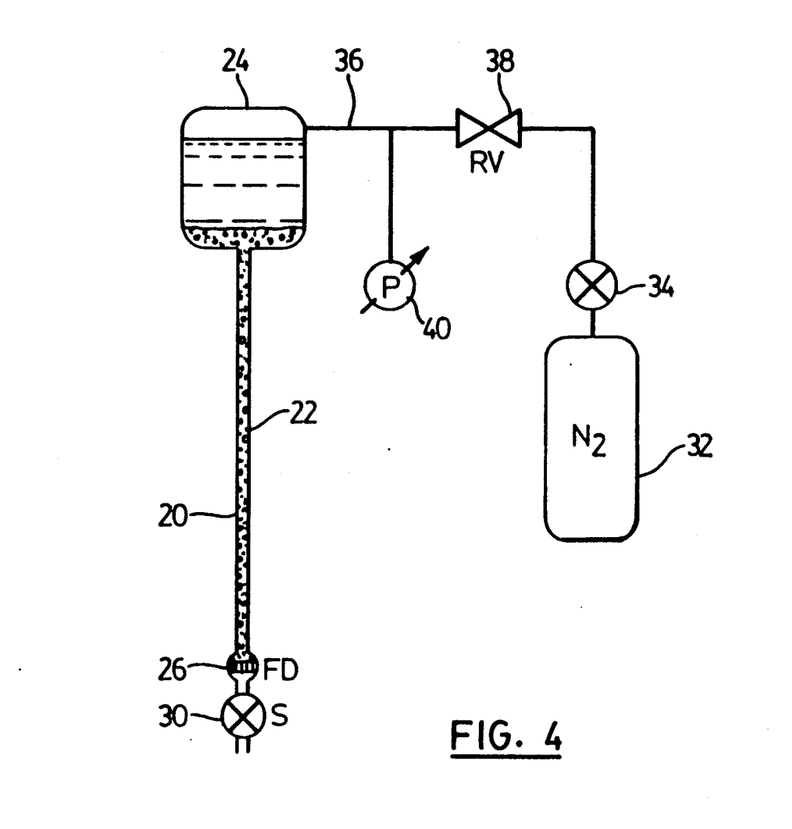
FIG. 4 illustrates one embodiment showing an apparatus used for observing the instability in the flow system generated by the method forming the subject invention.

We report here the first experimental verification of DIFICI and the resulting wave patterns in the ferroin-catalyzed BZ system in a quasi-one dimensional flow tube. Referring to FIG. 4, the ferroin ion is immobilized on a cation-exchange resin [Maselko et al., 1989] shown at 20 located in a tube 22 and all other reactants flow through tube 22 as in a chromatographic column. The cation exchange resin 20 is one of many possible open support structures which may be used for immobilizing or partially immobilizing either the activation or inhibition means. The internal diameter of the glass tube 22 is 3.2 mm, the length of the tube is approximately 25 cm and a reservoir 24 is attached to the top of tube 22. The diameter of the reservoir is 25 mm. A fritted disk 26 is located at the bottom of the tube 22. Tube 22 is provided with a stopcock 30 to arrest the fluid flow through the tube. Dowex 50×4-400 ion exchange resin, and Aldrich chemicals were used. A 2M stock solution of bromomalonic acid (BMA) was prepared at 0° C. according to Reference [A. N. Zaikin et al., *Nature*, 225, 535 (1970)]. The volume of the bead suspension settled in distilled water was the reference value for the loading with ferroin instead of the weight of beads [Maselko et al., 1989]. A typical loading of $10^4$ moles/liter was used and the loaded beads were then mixed with the solution of the other reactants and the larger part of the mixture was transferred to the tubular reactor of FIG. 4. The rest was poured into a Petri dish (depth: 1 mm beads, 10 mm liquid) for use as a reference experiment. The beads filled the tube and part of the reservoir as shown in FIG. 4. This part was also used for the reference experiment. The fritted glass disk 26 prevented washout of the beads. The flow rate was controlled by applying compressed nitrogen gas supplied from a nitrogen gas tank 32 having an on/off valve 34. The flow was assumed to be proportional to pressure. The gas is fed to the upper portion of the reservoir 24 via a gas line 36. The line pressure is controlled by a pressure regulating valve 38. A pressure sensor 40 attached to line 36 provided a means of monitoring the gas pressure. Experiments were discarded when the reference experiments showed oscillatory or pacemaker activity. The sets of parameters commonly used were: $[H_2SO_4]=0.02M$, $[Fe(phen)^{2+}_3]+[Fe(phen)^{3+}_3]=10^{-4}M$ and a) $[NaBrO_3]=0.8M$, $[BMA]=0.4M$, and b) $[NaBrO_3]=1.5M$, $[BMA]=0.5M$. Using malonic acid instead of BMA resulted in a poorer colour contrast and reproducibility. Typically, one experiment lasted 0.5-2 hours.

Figure 5:
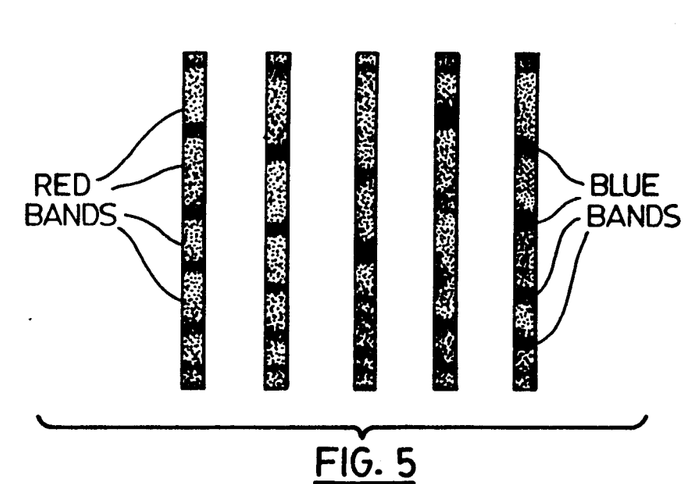
FIG. 5 shows the propagation of the waves generated by a differential flow using the apparatus of FIG. 4.
Figure 6A:
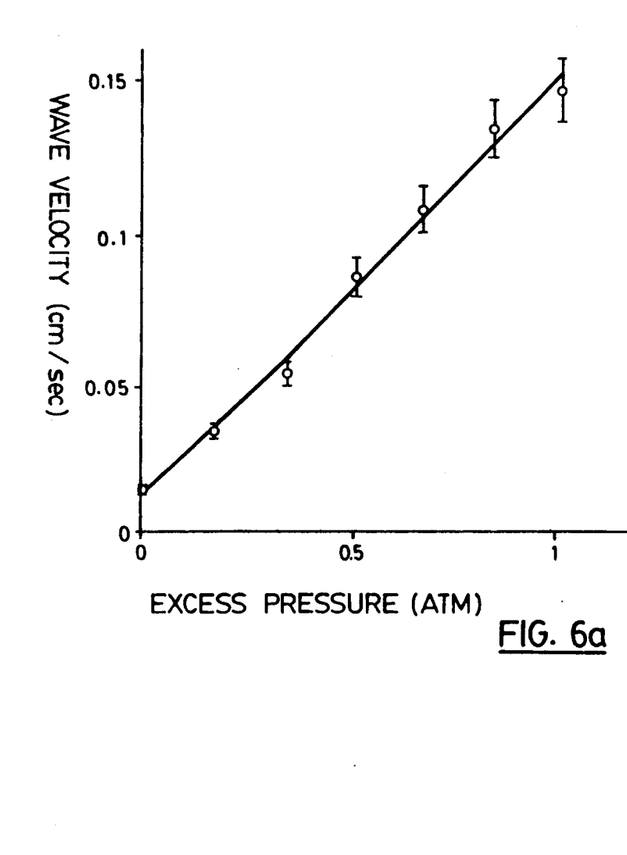
Figure 6B:
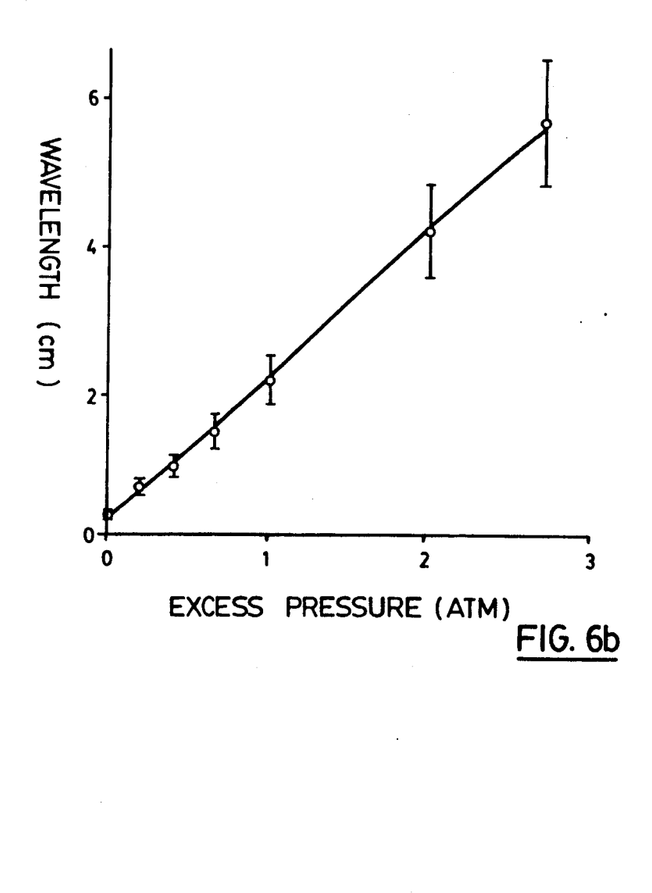

When pressure was applied to the top of reservoir 24, pale blue waves were observed that propagated down tube 22. As discussed previously, ferroin is immobilized on the ion-exchange resin that is packed in tube 22 while the flow of the other reactants is downwards. The time interval between two successive frames is 20 sec. The distance between the red markers is 5 cm. The waves were recorded on videotape, and the images were then processed on a computer to enhance contrast and assign colours. A diagrammatic representation of the travelling waves is shown in FIG. 5. The length and velocity of the waves were measured as functions of applied pressure. Both functions are linear (see FIGS. 6a and b). The non-zero wavelength and velocity at zero excess pressure reflect a residual flow due to gravity filtration. A peculiarity of the BZ system is the evolution of gas. This leads to a slow build-up of internal pressure, normally small in comparison with the external pressure. However it produced an interesting effect when the downstream stopcock 30 was closed and the external pressure was released. In this case the internal pressure started to push the solution in the upper part of tube 22 upwards. Therefore one could see initially fading of the waves, followed by the reappearance of waves that slowly moved upwards. By applying a small external pressure this back-flow could be balanced thereby causing the waves to disappear again. Due to the dead volume between the filter plug and the stopcock, a small flow persisted even with the stopcock shut, when more pressure was applied. This additional pressure caused the waves to reappear and propagate downwards. When such a balance was achieved we could create and extinguish the waves and reverse their direction many times. The characteristic length of these slow waves was about 1 mm and they appeared and disappeared almost synchronously on a time scale of ca. 0.5 rain on a 10 cm segment.

Figure 6C:
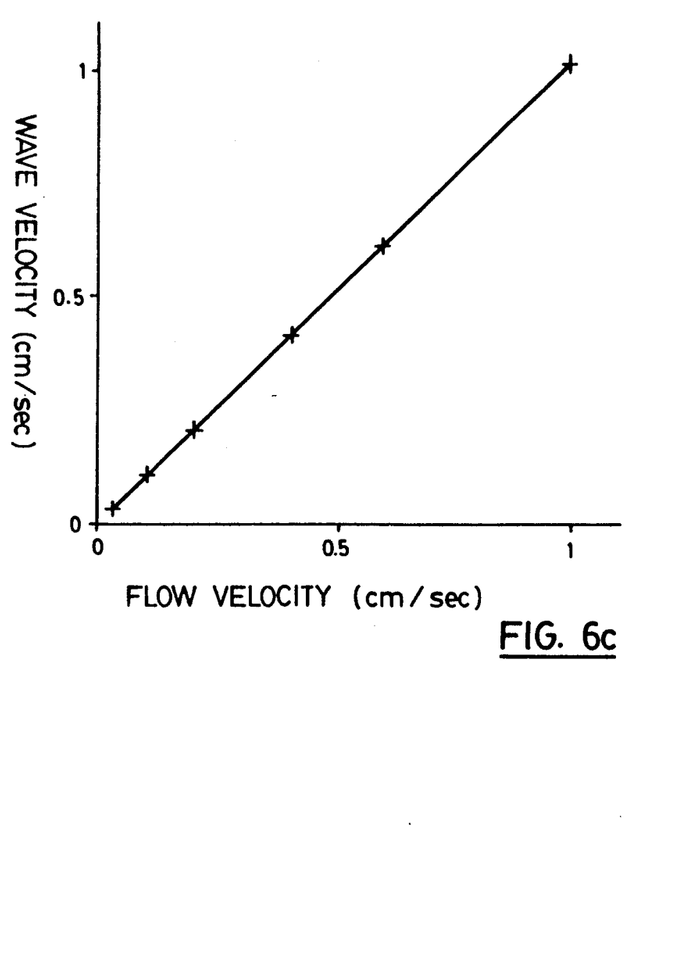
Figure 6D:
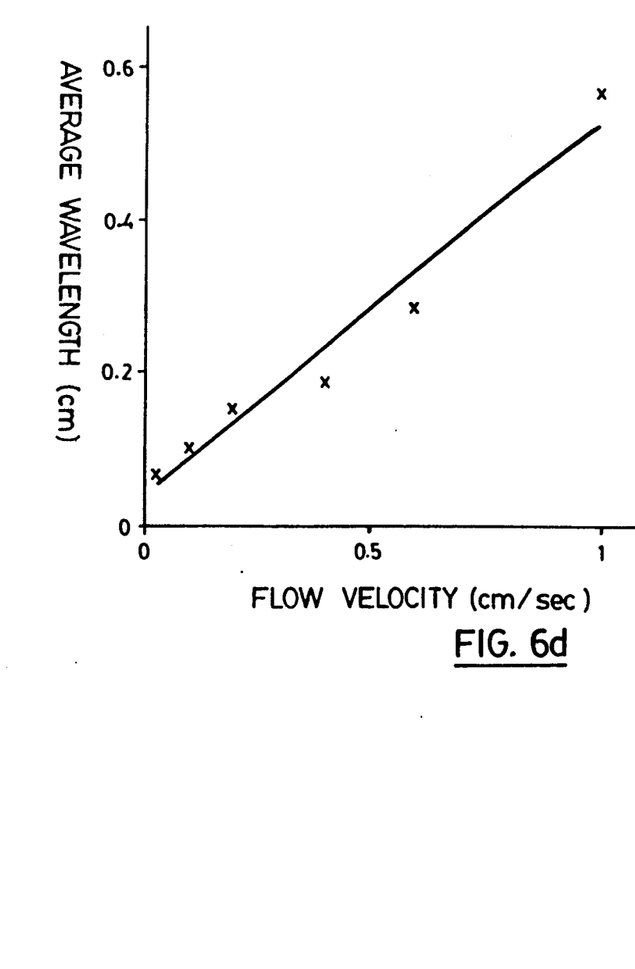

To provide a qualitative comparison between the above disclosed theoretical predictions and the experimentally measured properties, the calculated velocity and wavelength based on the Puschinator model are plotted in the FIGS. 6c and 6d. The flow velocity through the packed tube was not measured. Therefore, the experimental (FIGS. 6a, b) and calculated (FIGS. 6c, d) graphs cannot be directly superimposed. Nevertheless, their qualitative and semi-quantitative agreement is good.

Like in Turing structures, the wavelength is an intrinsic property of the system and is not determined by an external pacemaker as in trigger waves. Another difference is that the waves induced by DIFICI develop simultaneously over the entire reactor and they are asymmetric, propagating only in the direction of the flow. Trigger waves, on the other hand, are excited locally and emitted with radial symmetry [Winfree, 1987]. This difference is illustrated by comparison with a previous experiment [K. I. Agladze et al., Z. Phys. Chem., 173, 79 (1981)] where a similar setup was used to study the effect of a differential flow on externally initiated trigger waves. The latter propagated in both directions from the pacemaker, they persisted at zero flow and they disappeared above a critical flow rate. For the DIFICI, on the other hand, the supporting theoretical study disclosed herein predicts a lower limit of the flow rate but no upper limit. Although we could not measure this lower limit, the above observations are clear evidence for its existence. There was no evidence for the existence of an upper limit.

While the occurrence of the Turing instability depends crucially on the ratio of diffusion coefficients $\delta = D_{knh}/D_{act}$ the differential flow induced instability DIFICI is determined merely by the magnitude $|v|$ of the easily controllable relative flow velocity (or by the ratio $|v|/\sqrt{D}$ when diffusion is included). Thus it is immaterial which of the two control species is immobilized. As the illustrative example disclosed herein shows, fixing the inhibitor[11] promotes the DIFICI, while this would prevent the Turing instability from occurring. Thus, it is the interaction between the relative diffusion of the control species and the reactivity of the control species which give rise to spatially fixed Turing patterns while in the method of the present invention it is the interaction of the relative flow between the control species and the reactivity of the control species which give rise to the predicted and observed spatiotemporal structures disclosed herein.

The formalism developed in equations (1) to (7), based on the assumption that the reactive system has a stable steady state, predicts that under certain conditions the system can be induced to evolve a spatially periodic structures arising from the disengagement of the control species and that this periodic pattern is of the travelling wave type. These structures are induced and certain properties of the structures are controlled by causing a differential flow between the control species which forms the method of the present invention. The method has been illustrated by the non-limiting example of the BZ reaction using the Puschinator model to give the reaction equations (8) i.e. f(X,Y) and g(X,Y). In this particular system the ferroin catalyst is the inhibitor and the autocatalyst $HBrO_2$ is the activator. Therefore, while the differential flow induced chemical instability method of forming periodic spatio-temporal structures has been described and illustrated with specific reference to a liquid, reactive system, characterized by activator/inhibitor kinetics, those skilled in the art will readily appreciate that the differential flow-induced instability disclosed herein may be applied to a broad range of chemical, physical, biological and sociobiological systems in which relative motion of activator and inhibitor species of the systems exist or can be induced. For example, non-limiting examples of such systems comprise the solid state including semiconductors and superconductors as well as low-temperature plasmas, electrolyte solutions in external fields, heterogeneous catalytic systems, and systems in developmental biology, physiology, immunology, microbiology, epidemiology and population biology to mention just a few. Other systems to which the method disclosed herein is applicable and which fall within the ambit of the present invention will be apparent to those skilled in the art.

The means for inducing differential flow between the activation means and the inhibition means will depend on the particular system under consideration. For example, in systems utilizing fluid flow, separation may be achieved in several ways depending on the nature of the activation and inhibition means. Specifically, where the activation and inhibition means are discrete activator and inhibitor species of a molecular nature, one of the species may be partially or fully immobilized in an open support structure such as an inert packing material or ion exchange medium while the other species can be flowed through the open support structure in the fluid past the immobilized species. As discussed previously, either activator or inhibitor species may be immobilized.

In the case where at least one of the activator or inhibitor means are charged, the differential flow may be achieved by imposing a drift on the charged species. This drift may be imposed using external fields such as magnetic fields, electric gradients or thermal gradients. Obvious applications are in the fields of plasmas, semiconductors and superconductors.

Figure 7:
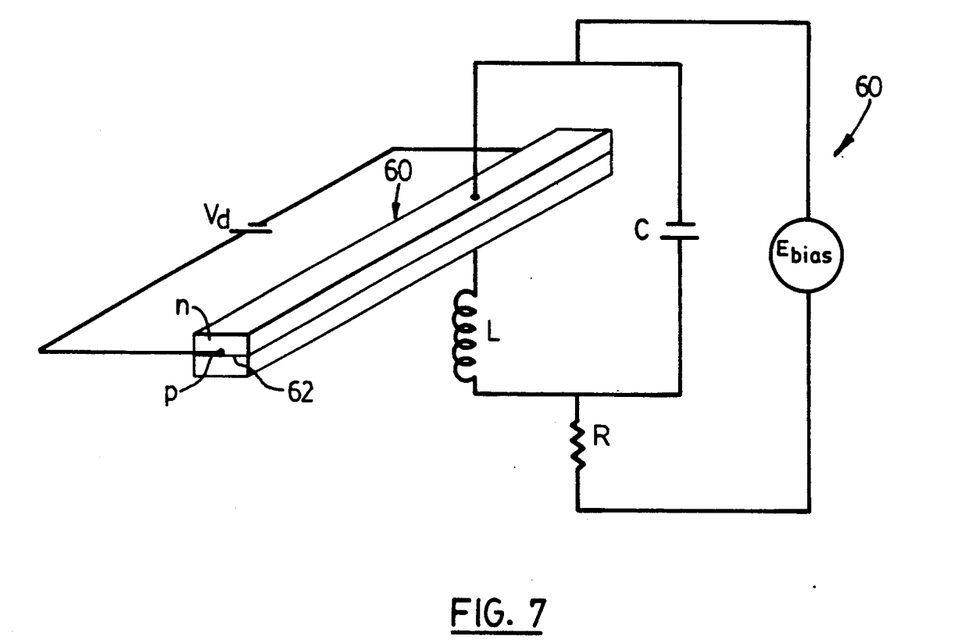
FIG. 7 shows a schematic representation of an electrical device comprising a semiconductor in which the homogeneous steady state is destabalized using the method of the present invention.

In semiconducting systems the activation means and the inhibition means may be a voltage and current or vice versa. The differential flow may be achieved by imposing drift on the charge carriers forming the current in the semiconducting system by an external magnetic or electric field applied along a portion of the semiconducting system. Alternatively, the differential flow may be achieved by imposing drift on the charge carriers forming said current by applying heat to at least a portion of the semiconductor. FIG. 7 illustrates an example of such a system wherein a semiconductor junction device 60 comprises a pn junction 62 across which a resonant LRC circuit 64 is connected which produces a current $i_{ac}$. A voltage $V_d$ is applied parallel to junction 62 to provide a differential flow between current $i_{ac}$ and the junction voltage $E_{bias}$.

Figure 8:
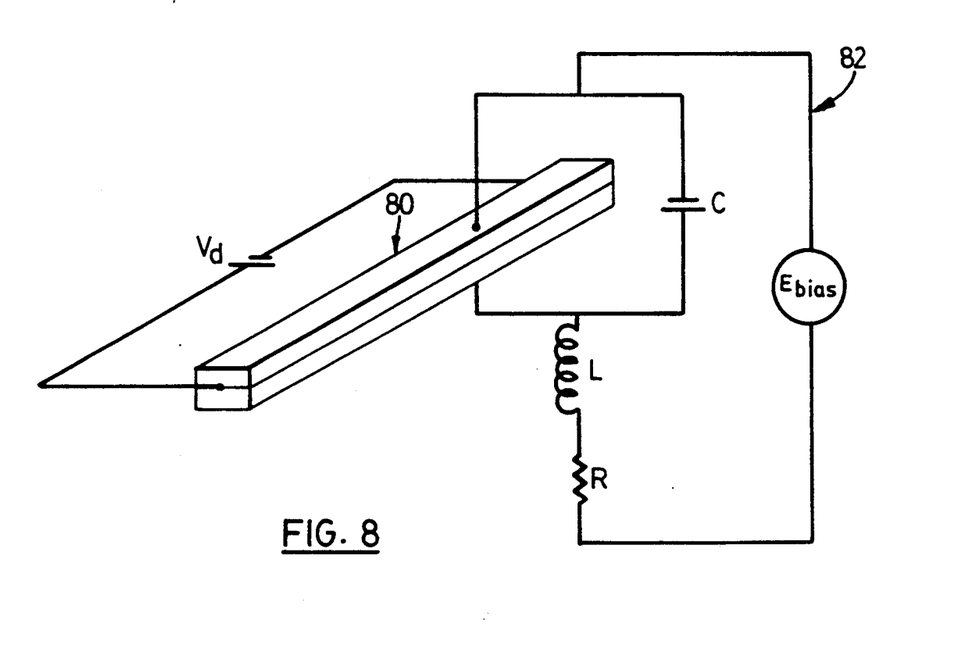
FIG. 8 is a schematic representation of another electrical device comprising a superconductor in which the homogeneous steady state is destabilized using the method disclosed herein.

Similarly, in superconducting systems the activation means and the inhibition means may be a voltage and current or vice versa. The differential flow may be achieved by imposing drift on the charge carriers forming the current in the semiconducting system by an external magnetic or electric field applied along a portion of the semiconducting system. FIG. 8 illustrates an example of such a system wherein a superconducting device 80 has a resonant LRC circuit 82 applied thereacross which produces a current $i_{ac}$. A voltage $V_d$ is applied transversely to the direction of $i_{ac}$ to provide a differential flow between current $i_{ac}$ and voltage $E_{bias}$.

In chemical and physical systems, heat generated in a process can play the role of activator or inhibitor. For example, heat may be used to increase a chemical reaction rate of an exothermic reaction which in turn generates more heat. Thus, the instability described earlier may also be induced for the purposes of control, production, or measurement in this type of system by suitable differential flows.

A common characteristic of all living systems is their excitability i.e. the involvement of activation/inhibition kinetics. Cells and organs are commonly bathed in flows containing activator and/or inhibitor species, thereby endowing the system with the potential for inducing the above outlined instability. This opens the possibility of controlling periodic processes in physiology, immunology, epidemiology, microbiology, population ecology and developmental biology.

The overall utility of the present invention is to provide a general means of destabilizing a homogeneous steady state of a dynamical system that is characterized by activator/inhibitor kinetics by means of a differential bulk flow of the key species. This dynamical instability gives rise to periodic or aperiodic spatiotemporal structures or travelling waves. As discussed previously, the class of kinetic systems with these properties is very broad. However, it will be appreciated that systems in which these structures are induced may have multiple independent uses in process control and in production and in diagnostics and measurement.

The patterns themselves may be used for various applications in and of themselves. For example, since the tunable patterns reflect local concentration variations of the control species, various optical devices based on these patterns may be constructed. The variations in optical properties may be used for certain types of gratings or diffractometers for interacting with light. The tunability of the wavelength of the patterns can give an advantage over solids characterized by fixed parameters.

Further, because the activation/inhibition systems to which the present invention applies comprise kinetically coupled control species, the method disclosed herein may have applicability to controlling heterogeneous catalysis, reaction pathways in heterogeneous and homogeneous reactions, reaction yields and product quality to mention just a few.

Therefore what is claimed is:

1. A method of inducing spatiotemporal structures in systems being characterized by coupled activation and inhibition kinetics, the method comprising the steps of:
   providing a system having an activation means and an inhibition means;
   inducing spatiotemporal structures in said system by producing a differential flow between the activation means and the inhibition means, said differential flow being greater than a predeterminable threshold differential flow.

2. The method according to claim 1 wherein said system is a reactive system in which said inhibition means is an inhibitor species and said activation means is an activator species.

3. The method according to claim 2 including a fluid and an open support structure, wherein said differential flow is achieved by immobilizing one of said species in an open support structure and flowing the other non-immobilized species in said fluid through said open support structure.

4. The method according to claim 3 wherein the inhibitor species is immobilized in said open support structure and the activator species is flowed through said open support structure in said fluid.

5. The method according to claim 3 wherein the activator species is immobilized in said open support structure and the inhibitor species is flowed through said open support structure in said fluid.

6. The method according to claim 2 wherein said reactive system is a chemical reaction system.

7. The method according to claim 2 wherein said reactive system is a biochemical reaction system.

8. The method according to claim 2 wherein said reactive system is a biological system.

* * * * *